US012334572B2

(12) United States Patent
Chen et al.

(10) Patent No.: US 12,334,572 B2
(45) Date of Patent: Jun. 17, 2025

(54) SEALING ASSEMBLY FOR SEALING THROUGH HOLE, AND METHOD AND DEVICE FOR PREPARING BATTERY CELL

(71) Applicant: JIANGSU CONTEMPORARY AMPEREX TECHNOLOGY LIMITED, Changzhou (CN)

(72) Inventors: Xinxiang Chen, Changzhou (CN); Yulian Zheng, Changzhou (CN); Shoujun Huang, Changzhou (CN); Peng Wang, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 230 days.

(21) Appl. No.: 18/180,815

(22) Filed: Mar. 8, 2023

(65) Prior Publication Data
US 2023/0223626 A1 Jul. 13, 2023

Related U.S. Application Data

(63) Continuation of application No. PCT/CN2021/105758, filed on Jul. 12, 2021.

(51) Int. Cl.
*H01M 50/184* (2021.01)
*H01M 50/183* (2021.01)
(Continued)

(52) U.S. Cl.
CPC ....... *H01M 50/184* (2021.01); *H01M 50/183* (2021.01); *H01M 50/186* (2021.01);
(Continued)

(58) Field of Classification Search
CPC ............. H01M 50/184; H01M 50/183; H01M 50/186; H01M 50/209; H01M 50/636;
(Continued)

(56) References Cited

U.S. PATENT DOCUMENTS

| 2008/0160393 A1* | 7/2008 | Kim ................... H01M 50/627 156/60 |
| 2011/0081566 A1* | 4/2011 | Kobayashi .......... H01M 50/186 29/623.2 |

(Continued)

FOREIGN PATENT DOCUMENTS

CN 102610783 A 7/2012
CN 203441906 U 2/2014
(Continued)

OTHER PUBLICATIONS

International Search Report received in the corresponding International Application PCT/CN2021/105758, mailed Dec. 8, 2021.
(Continued)

*Primary Examiner* — Ula C Ruddock
*Assistant Examiner* — Sydney L Kline
(74) *Attorney, Agent, or Firm* — K&L Gates LLP

(57) ABSTRACT

A sealing assembly for sealing a through hole, and a method and device for preparing a battery cell are provided. The sealing assembly comprises: a sealing sleeve provided in the through hole and having a cavity and an opening that is in communication with the cavity; an elastic sleeve tube provided in the cavity and having a first mounting hole that extends in an axial direction of the through hole; and a central rod, which is provided in the first mounting hole and is in threaded connection with the elastic sleeve tube to enable the elastic sleeve tube to expand in a radial direction of the through hole to press the sealing sleeve and form, on an outer wall of the elastic sleeve tube, a raised portion that rivets the sealing sleeve to the through hole.

19 Claims, 8 Drawing Sheets

(51) Int. Cl.
*H01M 50/186* (2021.01)
*H01M 50/209* (2021.01)
*H01M 50/636* (2021.01)
*H01M 50/645* (2021.01)

(52) U.S. Cl.
CPC ....... *H01M 50/209* (2021.01); *H01M 50/636* (2021.01); *H01M 50/645* (2021.01)

(58) Field of Classification Search
CPC ..... H01M 50/645; C10H 21/14; C12M 37/04; D06B 23/18; D10B 2505/06
See application file for complete search history.

(56) References Cited

U.S. PATENT DOCUMENTS

| | | | |
|---|---|---|---|
| 2012/0107653 A1 | 5/2012 | Guen et al. | |
| 2015/0325833 A1* | 11/2015 | Harayama | H01M 50/645 |
| | | | 429/185 |

FOREIGN PATENT DOCUMENTS

| | | | | |
|---|---|---|---|---|
| CN | 103814457 A | | 5/2014 | |
| CN | 106450070 A | | 2/2017 | |
| CN | 108716388 A | * | 10/2018 | ............. E21B 33/10 |
| CN | 109585772 A | | 4/2019 | |
| CN | 210628405 U | | 5/2020 | |
| CN | 111490192 A | * | 8/2020 | ............ H01M 50/148 |
| CN | 211980653 U | | 11/2020 | |
| CN | 112103414 A | | 12/2020 | |
| CN | 212323088 U | | 1/2021 | |
| CN | 212542633 U | | 2/2021 | |
| CN | 212625812 U | | 2/2021 | |
| CN | 112635934 A | | 4/2021 | |
| JP | 10169778 A | * | 6/1998 | |
| JP | 2012146587 A | * | 8/2012 | |
| JP | 5589228 B2 | | 9/2014 | |
| JP | 2014175143 A | | 9/2014 | |
| JP | 2015082439 A | | 4/2015 | |
| JP | 2016081826 A | | 5/2016 | |
| JP | 6015553 B2 | * | 10/2016 | |
| JP | 2018185969 A | | 11/2018 | |
| KR | 1020140078812 A | | 6/2014 | |

OTHER PUBLICATIONS

Written Opinion received in the corresponding International Application PCT/CN2021/105758, mailed Dec. 8, 2021.
First Office Action received in the corresponding Chinese Application 202110262539.4, mailed Apr. 15, 2021.
Second Office Action received in the corresponding Chinese Application 202110262539.4, mailed May 6, 2021.
First Office Action received in the corresponding Korean Application 10-2022-7038853, mailed Dec. 29, 2022.
First office action received in the corresponding Japanese Application 2022-568634, mailed May 29, 2023.
Notice of Allowance received in the corresponding Korean Application 10-2022-7038853, mailed May 3, 2023.
The extended European search report received in the corresponding European Application 21929793.4, mailed Nov. 2, 2023.

* cited by examiner

SEALING ASSEMBLY FOR SEALING THROUGH HOLE, AND METHOD AND DEVICE FOR PREPARING BATTERY CELL

CROSS-REFERENCE TO RELATED APPLICATIONS

The present application is a continuation of International Application PCT/CN2021/105758, filed Jul. 12, 2021, which claims the priority of Chinese patent application no. CN202110262539.4, entitled "Sealing Assembly for Sealing Through Hole, and Method and Device for Preparing Battery Cell" and filed on Mar. 10, 2021, which is incorporated herein by reference in its entirety.

TECHNICAL FIELD

The present application relates to the field of rechargeable batteries, and more particularly to a sealing assembly for sealing a through hole, and a method and device for preparing a battery cell.

BACKGROUND ART

A battery cell has extremely high requirements on structural closure property. During use, there should be no electrolytic solution leakage that will pollute the surrounding air and environment, and there should be no moisture entering the interior of the battery cell and reacting with the electrolytic solution, which will shorten the service life of the battery cell. Therefore, in the prior art, after the electrolytic solution filling for a battery cell, in order to ensure the sealing performance of the battery cell, it is usually necessary to completely close a through hole. However, how to improve the sealing effect of the through hole is an urgent problem to be solved at present.

SUMMARY OF THE INVENTION

Embodiments of the present application provide a sealing assembly for sealing a through hole, and a method and device for preparing a battery cell, which can enhance the sealing performance of a through hole in the battery cell.

In a first aspect, a sealing assembly for sealing a through hole is provided, the sealing assembly comprising: a sealing sleeve provided in the through hole and having a cavity and an opening that is in communication with the cavity; an elastic sleeve tube provided in the cavity and having a first mounting hole that extends in an axial direction of the through hole; and a central rod, which is provided in the first mounting hole and is in threaded connection with the elastic sleeve tube to enable the elastic sleeve tube to expand in a radial direction of the through hole to press the sealing sleeve and form, on an outer wall of the elastic sleeve tube, a raised portion that rivets the sealing sleeve to the through hole.

Therefore, in the sealing assembly for sealing a through hole according to the embodiments of the present application, when the central rod is provided in the first mounting hole of the elastic sleeve tube, the elastic sleeve tube can expand in the radial direction of the through hole and then press the sealing sleeve such that the sealing sleeve is in an interference-fit with the through hole to achieve the purpose of sealing the through hole. Moreover, by means of such radial pressing, the portions of the sealing sleeve and the elastic sleeve tube which are located inside the battery cell are turned outward relative to the through hole after pressing, and the elastic sleeve tube turned outward forms the raised portion. In addition, the sealing sleeve correspondingly forms a protruding portion, so that the sealing assembly corresponding to the protruding portion has a greater diameter than the through hole and is then fastened and fixed to the through hole to ensure the stable fixing of the sealing assembly in the axial direction of the through hole. Also, since threaded connection is used between the central rod and the elastic sleeve tube, the sealing assembly can be quickly disassembled without destroying components. In this way, taking an example of using the sealing assembly to seal a liquid injection hole in the battery cell, it is possible to maintain a consistent appearance of the battery cell before and after liquid injection or replenishment, and maintain the sealing performance of the battery cell.

In some embodiments, the sealing sleeve further has a sealing end provided opposite the opening so as to further enhance the sealing performance of the sealing assembly.

In some embodiments, when the central rod is not provided in the elastic sleeve tube, the first mounting hole has different inner diameters at positions.

In some embodiments, when the central rod is not provided in the elastic sleeve tube, at least part of the first mounting hole has an inner diameter gradually decreasing in a first direction that is directed from the end at the opening of the sealing sleeve to the end opposite the opening.

In this way, when the sealing assembly is mounted, during the central rod moving downward in the first mounting hole, since the inner diameter of elastic sleeve tube gradually decreases, the elastic sleeve tube is pressed by the central rod to turn outward, which causes the elastic sleeve tube to expand in the radial direction and then press the sealing sleeve so as to form a seal between the sealing sleeve and the through hole.

In some embodiments, the end, away from the opening, of an inner wall of the elastic sleeve tube is provided with a protruding structure that is provided to be pressed by the central rod to enable the elastic sleeve tube to expand in the radial direction of the through hole.

In this way, when the sealing assembly is mounted, during the central rod moving downward in the first mounting hole, the protruding structure can be pressed by the central rod to expand in the radial direction, so that the elastic sleeve tube expands in the radial direction of the through hole and then presses the sealing sleeve so as to form a seal between the sealing sleeve and the through hole. Moreover, by means of such radial expansion, the end of the elastic sleeve tube close to the interior of the battery cell is also turned outward relative to the through hole to form the raised portion. In addition, the sealing sleeve correspondingly forms a protruding portion, so that the portion of the sealing assembly corresponding to the protruding portion has a greater diameter than the through hole, and is then fastened and fixed to the through hole to ensure the stable fixing of the sealing assembly in the axial direction of the through hole.

In some embodiments, the sealing sleeve comprises a first head portion and a first main body portion, the first main body portion having the opening and the cavity, the first head portion being provided around an outer edge of the opening, the first main body portion being provided in the through hole, and the first head portion being fixed outside the through hole.

In some embodiments, the elastic sleeve tube comprises a second head portion and a second main body portion, the second main body portion being provided with the first mounting hole, the second head portion being provided around an outer edge of the first mounting hole, the second main body portion being provided in the cavity, and the second head portion at least partially covering the first head portion.

In some embodiments, the second main body portion comprises at least one slit that extends, in the axial direction of the through hole, from the end of the second main body portion away from the opening to the other end and penetrates the second main body portion in the radial direction of the through hole, the slit being provided to achieve the expansion of the second main body portion in the radial direction of the through hole.

In some embodiments, the central rod comprises a third head portion and a third main body portion, the third head portion being provided on one side of the third main body portion, the third main body portion being provided in the first mounting hole, and the third head portion at least partially covering the second head portion.

In some embodiments, an outer wall of the third main body portion is in threaded connection with an inner wall of the second main body portion.

Since the threaded connection is easy to disassemble, the threaded connection between the third main body portion and the second main body portion can achieve the quick assembly and disassembly between the central rod and the elastic sleeve tube, and then achieve the quick assembly and disassembly between the sealing assembly and an end cap.

In some embodiments, the sealing assembly further comprises an outer sleeve member provided outside the through hole, the outer sleeve member being fixedly connected to the elastic sleeve tube and the sealing sleeve.

By means of the outer sleeve member, the sealing sleeve and the elastic sleeve tube are not prone to disengage in the axial direction of the through hole.

In some embodiments, the outer sleeve member has a second mounting hole, and the first head portion and the second head portion are both fixed in the second mounting hole.

In some embodiments, an inner wall of the outer sleeve member is in threaded connection with the first head portion; and/or the inner wall of the outer sleeve member is in threaded connection with the second head portion.

The threaded connection can achieve the quick disassembly between the outer sleeve member and the elastic sleeve tube and between the outer sleeve member and the sealing sleeve.

In some embodiments, the surface of the end of the outer sleeve member close to the third head portion is flush with the surface of the end of the second head portion close to the third head portion.

In this way, it is convenient for mounting and fixing the central rod, so that the third head portion of the central rod is more stable.

In some embodiments, the third head portion at least partially covers the end of the outer sleeve member close to the third head portion such that the outer sleeve member can be fixed by means of the central rod so as to prevent the disengagement of the outer sleeve member in the axial direction of the through hole.

In some embodiments, the end of the outer sleeve member close to the through hole has a limiting portion that extends in the axial direction of the through hole, and the first head portion and the second head portion are provided between the limiting portion and the third head portion.

In this way, the outer sleeve member, the elastic sleeve tube and the sealing sleeve after being mounted are more stable, and the elastic sleeve tube and the sealing sleeve are not prone to disengagement.

In some embodiments, the elastic sleeve tube has a greater hardness than the sealing sleeve.

In this way, when the battery cell is impacted, the sealing assembly will not disengage from the through hole due to the material of the elastic sleeve tube being too soft.

In a second aspect, an end cap assembly is provided, the end cap assembly being provided on a battery cell, and the end cap assembly comprising: an end cap having a through hole for liquid injection; and the sealing assembly in the first aspect or in any one of the embodiments in the first aspect, the sealing assembly being provided to seal the through hole.

In a third aspect, a battery cell is provided, comprising: a housing, with one end of the housing being provided with an opening; and the end cap assembly in the second aspect for closing the opening of the housing.

In a fourth aspect, a battery is provided, comprising: a plurality of battery cells including at least one battery cell in the third aspect.

In a fifth aspect, a power consuming apparatus is provided, comprising: a battery in the fourth aspect for supplying electric energy.

In some embodiments, the power consuming apparatus is a vehicle, a ship, or a spacecraft.

In a sixth aspect, a method for preparing a battery cell is provided, the method comprising: providing a housing, with one end of the housing being provided with an opening; providing an end cap assembly, which is used to close the opening of the housing and comprises an end cap and a sealing assembly, the end cap having a through hole for liquid injection; providing a sealing sleeve, which is provided in the through hole and has a cavity and an opening that is in communication with the cavity; providing an elastic sleeve tube, which is provided in the cavity and has a first mounting hole that extends in an axial direction of the through hole; and providing a central rod, which is provided in the first mounting hole and is in threaded connection with the elastic sleeve tube to enable the elastic sleeve tube to expand in a radial direction of the through hole to press the sealing sleeve and form, on an outer wall of the elastic sleeve tube, a raised portion that rivets the sealing sleeve to the through hole.

In a seventh aspect, a device for preparing a battery cell is provided, the device comprising a module for implementing the method in the sixth aspect.

DETAILED DESCRIPTION OF EMBODIMENTS

Figure 1:
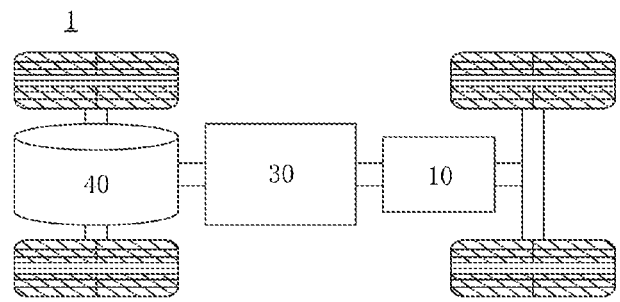
FIG. 1 is a schematic diagram of a vehicle according to an embodiment of the present application.

The technical solutions in the embodiments of the present application will be described below in conjunction with the accompanying drawings.

In order to make the objectives, technical solutions and advantages of the embodiments of the present application clearer, the technical solutions in the embodiments of the present application will be described clearly below in conjunction with the drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

All the technical and scientific terms used in the present application have the same meaning as those commonly understood by those skilled in the pertinent technical field of the present application, unless otherwise defined; the terms used in the specification of the present application are merely for the purpose of description of the particular embodiments, but are not intended to limit the present application; and the terms "comprising", "having" and any variations thereof in the specification and the claims of the present application as well as the brief description of the drawings described above are intended to cover non-exclusive inclusion. The terms "first", "second" and the like in the specification and the claims of the present application as well as the above drawings are used to distinguish different objects, rather than describing a specific order or a primary-secondary relationship.

In the present application, "embodiment" mentioned means that the specific features, structures and characteristics described in conjunction with the embodiments may be are included in at least one embodiment of the present application. The phrase at various locations in the specification does not necessarily refer to the same embodiment, or an independent or alternate embodiment exclusive of another embodiment. Those skilled in the art should understand, in explicit and implicit manners, that an embodiment described in the present application may be combined with another embodiment.

In the description of the present application, it should be noted that, unless otherwise defined and limited explicitly, the term "mounting", "connection", "connected" and "attached" should be construed in a broad sense, which may be, for example, being fixedly connected, detachably connected or integrally connected; or may be direct connection or indirect connection by means of an intermediate medium, or may be communication between the interiors of two elements. For those of ordinary skills in the art, the specific meaning of the terms mentioned above in the present application can be understood according to specific circumstances.

In the present application, the term "and/or" is only an association relationship describing associated objects and represents that there may be three relationships, for example, A and/or B may represent three situations: A alone, both A and B, and B alone. In addition, the character "/" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the drawings, as well as the dimensions, such as overall thickness, length and width, of an integrated device are illustrative only and should not be construed to limit the present application in any way.

In the present application, "a plurality of" means two or more, and similarly, "a plurality of groups" means two or more groups, and "a plurality of pieces" means two or more pieces.

In the present application, the battery cell may include a lithium ion secondary battery, a lithium ion primary battery, a lithium-sulfur battery, a sodium/lithium ion battery, a sodium ion battery or a magnesium ion battery, etc., which is not limited by the embodiments of the present application. The battery cell may be cylindrical, flat, cuboid or in another shape, which is not limited by the embodiments of the present application. The battery cell is generally classified into three types according to the way of packaging: cylindrical battery cells, prismatic battery cells and pouch battery cells, which are also not limited in the embodiments of the present application.

A battery mentioned in the embodiments of the present application refers to a single physical module comprising one or more battery cells to provide a higher voltage and capacity. For example, the battery mentioned in the present application may include a battery module or a battery pack, etc. The battery generally comprises a case body for packaging one or more battery cells. The case body can prevent liquid or other foreign matters from affecting the charging or discharging of the battery cell.

The battery cell comprises an electrode assembly and an electrolytic solution, the electrode assembly being composed of a positive electrode plate, a negative electrode plate and a separator. The battery cells operate mainly by means of metal ions moving between the positive electrode plate and the negative electrode plate. The positive electrode plate comprises a positive current collector and a positive active material layer, the positive active material layer being coated on a surface of the positive current collector, with the positive current collector not coated with the positive active material layer protruding from the positive current collector coated with the positive active material layer, and the positive current collector not coated with the positive active material layer serving as a positive electrode tab. Taking a lithium ion battery as an example, the positive current collector may be made of aluminum, and the positive electrode active material may be lithium cobalt oxides, lithium iron phosphate, ternary lithium or lithium manganate, etc. The negative electrode plate comprises a negative current collector and a negative active material layer, the negative active material layer being coated on a surface of the negative current collector, the negative current collector not coated with the negative active material layer protruding from the negative current collector coated with the negative active material layer, and the negative current collector not coated with the negative active material layer serving as a negative electrode tab. The negative current collector may be made of copper, and the negative active material may be carbon or silicon, etc. In order to ensure that no fusing occurs when a large current passes, a plurality of positive electrode tabs are provided and are stacked together, and a plurality of negative electrode tabs are provided and are stacked together. The separator may be made of PP or PE, etc. In addition, the electrode assembly may have a winding structure or may have a laminated structure, which is not limited in the embodiments of the present application.

It should be understood that the components in the battery case body described above should not be construed as a limitation on the embodiments of the present application, that is to say, the case body for a battery of the embodiments of the present application may or may not comprise the components described above.

The technical solutions described in the embodiments of the present application are all applicable to various devices using a battery, such as mobile phones, portable apparatuses, laptops, battery cars, electric toys, electric tools, electric vehicles, ships and spacecraft. For example, the spacecrafts include airplanes, rockets, space shuttles, space vehicles, etc.

It should be understood that the technical solutions described in the embodiments of the present application are not only applicable to the apparatuses described above, but also applicable to all apparatuses using a battery. However, for the sake of brevity of description, the following embodiments will be described taking an electric vehicle as an example.

For example, FIG. 1 shows a schematic structural diagram of a vehicle 1 according to an embodiment of the present application. The vehicle 1 be a fuel vehicle, a gas vehicle or a new-energy vehicle. The new-energy vehicle may be a battery electric vehicle, a hybrid vehicle, an extended-range vehicle, etc. The interior of the vehicle 1 may be provided with a motor 40, a controller 30 and a battery 10. The controller 30 is used to control the battery 10 to supply power to the motor 40. For example, the battery 10 may be provided at the bottom or the head or the tail of the vehicle 1. The battery 10 may be used to supply power to the vehicle 1. For example, the battery 10 can serve as an operating power source of the vehicle 1 for use in a circuit system of the vehicle 1, for example, to meet the working power demand of the vehicle 1 during startup, navigation and running. In another embodiment of the present application, the battery 10 can not only serve as an operating power source for the vehicle 1, but also serve as a driving power source for the vehicle 1, instead of or partially instead of fuel or natural gas, to provide driving power for the vehicle 1.

In order to meet different power demands, the battery 10 may comprise a plurality of battery cells which may be in series connection, parallel connection or series-parallel connection. The series-parallel connection refers to a combination of series connection and parallel connection. The battery 10 may also be referred to as a battery pack. Optionally, the plurality of battery cells may be in series connection or in parallel connection or in series-parallel connection to constitute a battery module, and then a plurality of battery modules may in series connection or in parallel connection or in series-parallel connection to constitute the battery 10. That is to say, the plurality of battery cells may directly constitute the battery 10, or may constitute a battery module, and then the battery modules constitute the battery 10.

Figure 2:
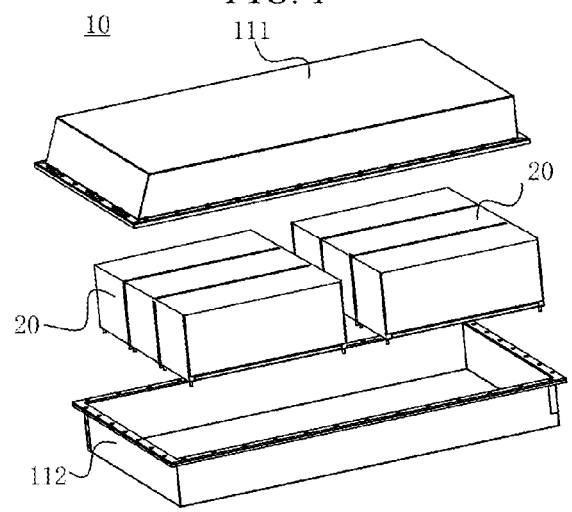
FIG. 2 is a schematic diagram of a battery according to an embodiment of the present application.

For example, FIG. 2 is a schematic structural diagram of a battery 10 in an embodiment of the present application. The battery 10 may comprise a plurality of battery cells 20. The battery 10 may further comprise a case body with the interior of the case body being of a hollow structure, and the plurality of battery cells 20 are accommodated in the case body. As shown in FIG. 2, the case body may comprise two portions, which are referred to herein as a first portion 111 and a second portion 112. The first portion 111 and the second portion 112 are fastened together. The first portion 111 and the second portion 112 may be shaped according to the shape of a combination of the plurality of battery cells 20, and at least one of the first portion 111 and the second portion 112 has an opening. For example, the first portion 111 and the second portion 112 may both be a hollow cuboid and each have only one face that is an open face, the opening of the first portion 111 being provided facing the opening of the second portion 112, and the first portion 111 and the second portion 112 being fastened to each other to form a case body having a closed chamber. For another example, only one of the first portion 111 and the second portion 112 may be of a hollow cuboid having an opening, and the other may be in the shape of a plate to close the opening. For example, taking an example here in which the second portion 112 is a hollow cuboid and has only one face that is an open face, while the first portion 111 is in the shape of a plate, the first portion 111 closes the opening of the second portion 112 to form a case body having a closed chamber that can be used to accommodate a plurality of battery cells 20. The plurality of battery cells 20 are in parallel connection or in series connection or in series-parallel connection for combination, and then provided in the case body which is formed of the first portion 111 and the second portion 112 by means of fastening.

Optionally, the battery 10 may further comprise other structures. For example, the battery 10 may further comprise a busbar component for achieving the electric connection, such as parallel connection or series connection or series-parallel connection, between the plurality of battery cells 20. Specifically, the busbar component may achieve the electrical connection between the battery cells 20 by means of connecting electrode terminals of the battery cells 20. Further, the busbar component may be fixed to the electrode terminals of the battery cells 20 by means of welding. The electric energy of the plurality of battery cells 20 may be further led out by means of an electrically conductive mechanism passing through the case body. Optionally, the electrically conductive mechanism may also be a busbar component.

Figure 3:
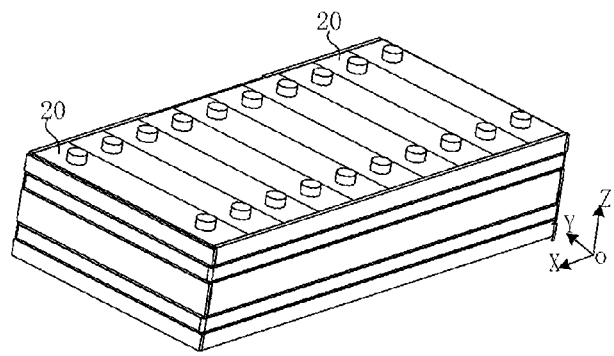
FIG. 3 is a schematic diagram of a battery module according to an embodiment of the present application.

The number of the battery cells 20 may be set as any value according to different power demands. The plurality of battery cells 20 may be in series connection, in parallel connection or in series-parallel connection to achieve higher capacity or power. Since each battery 10 may comprise a large number of the battery cells 20. For ease of installation, the battery cells 20 may be provided in groups, and each group of battery cells 20 constitutes a battery module. The number of the battery cells 20 included in the battery module is not limited and may be set as required. For example, FIG. 3 shows an example of a battery module. The battery may comprise a plurality of battery modules that may be in series connection, in parallel connection or in series-parallel connection.

Figure 4:
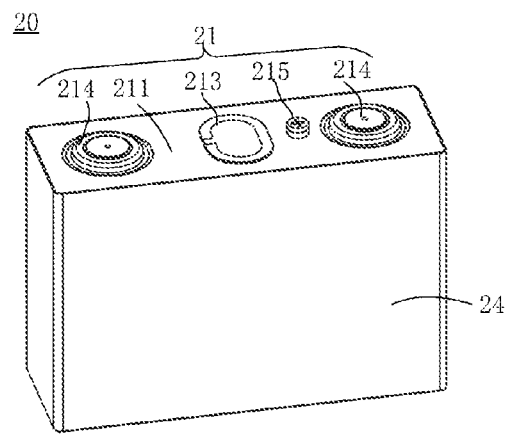
FIG. 4 is a schematic structural diagram of a battery cell according to an embodiment of the present application.
Figure 5:
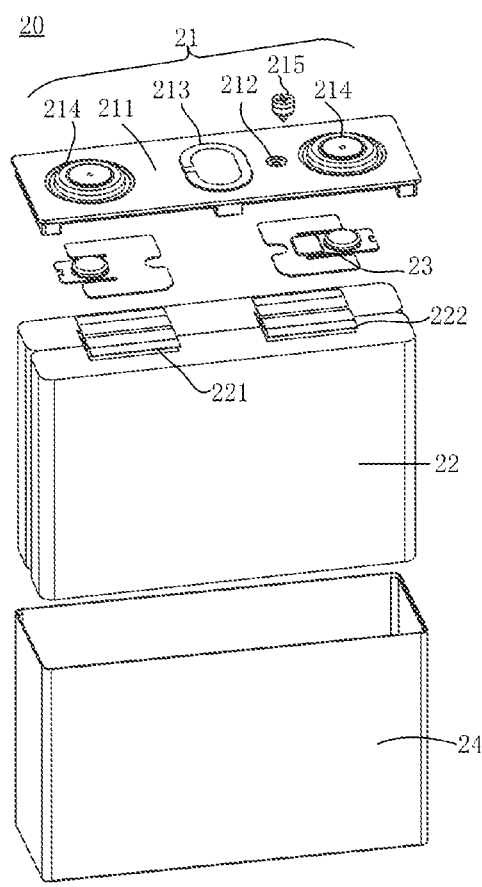
FIG. 5 is an exploded view of a battery cell according to an embodiment of the present application.

Any one of the battery cells will be described in detail below. FIG. 4 is a schematic structural diagram of a battery cell 20 according to an embodiment of the present application, and FIG. 5 is an exploded view of the battery cell 20 in FIG. 4. As shown in FIGS. 4 and 5, the battery cell 20 comprises one or more electrode assemblies 22, a housing 24 and an end cap assembly 21. The housing 24 is shaped according to the shape of one or more electrode assemblies 22 after combination. For example, the housing 24 may be a hollow cuboid or cube or cylinder, and one of the faces of the housing 24 has an opening such that the one or more electrode assemblies 22 can be placed in the housing 24. For example, when the housing 24 is a hollow cuboid or cube, one of the flat faces of the housing 24 is an open face, that is, this flat face has no wall such that the inside and outside of the housing 24 are in communication. When the housing 24 may be a hollow cylinder, an end face of the housing 24 is an open face, that is, this end face has no wall such that the inside and the outside of the housing 24 are in communication. The end cap assembly 21 comprises an end cap 211. The end cap 211 covers the opening and is connected to the housing 24 to form a closed chamber in which the electrode assemblies 22 are placed. The housing 24 is filled with an electrolyte, such as an electrolytic solution.

The end cap assembly of the battery cell 20 may further comprise two electrode terminals 214. The two electrode terminals 214 may be provided on the end cap 211. The end cap 211 is generally in the shape of a flat plate, the two electrode terminals 214 are fixed to a flat-plate face of the end cap 211, and the two electrode terminals 214 are respectively a positive electrode terminal and a negative electrode terminal. Each electrode terminal 214 is correspondingly provided with a connecting member 23, or may be referred to as a current collecting member 23 that is located between the end cap 211 and the electrode assembly 22 and used to achieve the electrical connection between the electrode assembly 22 and the electrode terminal 214.

Optionally, the electrode terminals 214 may also be provided in different manners as desired, for example, the two electrode terminals 214 may be provided on two different end caps 211.

As shown in FIGS. 4 and 5, each electrode assembly 22 has a first tab 221 and a second tab 222. The first tab 221 and the second tab 222 have opposite polarities. For example, when the first tab 221 is a positive electrode tab, the second tab 222 is a negative electrode tab. The first tab 221 of one or more electrode assemblies 22 is connected to an electrode terminal 214, for example, to a positive electrode terminal, by means of a connecting member 23; and the second tab 222 of one or more electrode assemblies 22 is connected to another electrode terminal 214, for example, to a negative electrode terminal, by means of another connecting member 23.

In this battery cell 20, according to the practical use demands, there may be a single or a plurality of electrode assemblies 22. As shown in FIG. 5, there are two independent electrode assemblies 22 in the battery cell 20.

Optionally, the end cap assembly 21 of the battery cell 20 may further be provided with a pressure relief mechanism 213. The pressure relief mechanism 213 is provided to be actuated, when the internal pressure or temperature of the battery cell 20 reaches a threshold, so as to relieve the internal pressure or temperature.

As shown in FIGS. 4 and 5, the end cap assembly 21 of the battery cell 20 is further provided with a through hole 212, and a sealing assembly 215 for sealing the through hole. Optionally, this through hole 212 may be a liquid injection hole or a hole for other purposes, for example, may also be a vent hole, which is not limited in the embodiments of the present application.

It is considered that the battery cell 20 has extremely high requirements on the structural closure property. During use, there should be no electrolytic solution leakage that will pollute the surrounding air and environment, and there should also be no moisture entering the interior of the battery cell 20 and reacting with the electrolytic solution, which will shorten the service life of the battery cell 20. Therefore, the sealing performance of the sealing assembly 215 has a great influence on the performance of the battery cell 20, and improving the sealing effect of the sealing assembly 215 on the through hole 212 is an urgent problem to be solved at present.

In addition, taking an example of the through hole 212 being a liquid injection hole, the electrolytic solution of the battery cell 20 is generally filled in a dry environment, and a large amount of energy is consumed to create a dry environment, greatly increasing the manufacturing cost. In order to ensure the sealing performance of the finished battery cell 20, the liquid injection hole is generally sealed by means of laser welding at present so as to completely close the liquid injection hole. However, during the use of the battery cell 20, after multiple charge-discharge cycles, the electrolytic solution inside the battery cell 20 will inevitably be partially irreversible consumed by reaction, and the service capacity of the battery cell 20 will decrease accordingly. If the electrolytic solution can be supplemented to the battery cell 20 after the battery cells 20 is used for a period of time, it is possible to effectively slow down the decrease in the capacity of the battery cell 20 and prolong the service life of the battery cell 20. However, in the case of sealing the liquid injection hole by means of welding, if the battery cell 20 is replenished after being used for a period of time, a laser weld structure needs to be destroyed, so even if the replenishment can be completed, the structure of the battery cell 20 is irreversibly destroyed, and the appearance cannot be restored to the original state, which affects the user experience.

Therefore, an embodiment of the present application provides a sealing assembly for sealing a through hole, which can solve the above-mentioned problem.

Figure 6:
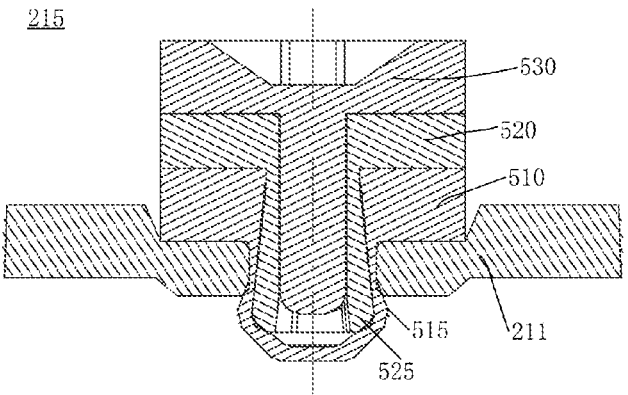
FIG. 6 is a cross-sectional view of a partial region of an end cap provided with a sealing assembly according to an embodiment of the present application.

It should be understood that the sealing assembly provided in the embodiment of the present application can be used for sealing a through hole. For example, the following description will be made by taking the sealing assembly for sealing the through hole 212 in the end cap 211 as shown in FIG. 5 as an example. FIG. 6 shows a cross-sectional view of a partial region of the end cap 211 provided with the sealing assembly 215 according to the embodiment of the present application, FIG. 7 shows an exploded view of the sealing assembly 215 according to the embodiment of the present application, and FIG. 8 shows a partial cross-sectional view of the end cap 211 where the through hole 212 is located according to the embodiment of the present application.

Figure 7:
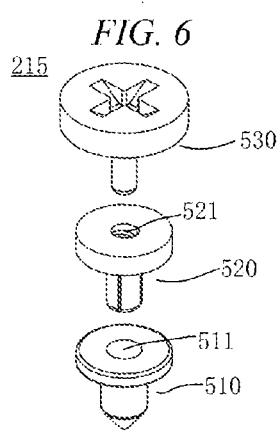
FIG. 7 is an exploded view of the sealing assembly shown in FIG. 6.
Figure 8:
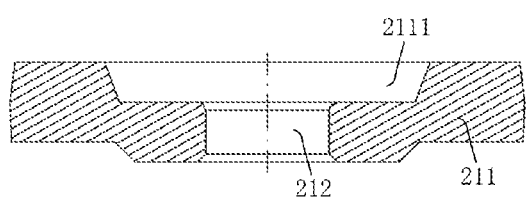
FIG. 8 is a partial cross-sectional view of an end cap according to an embodiment of the present application.

As shown in FIGS. 6 to 8, the sealing assembly 215 according to the embodiment of the present application may comprise: a sealing sleeve 510 provided in the through hole 212 and having a cavity and an opening 511, the opening 511 being in communication with the cavity; an elastic sleeve tube 520 provided in the cavity of the sealing sleeve 510, the elastic sleeve tube 520 having a first mounting hole 521 that extends in an axial direction of the through hole 212; and a central rod 530, which is provided in the first mounting hole 521 and is in threaded connection with the elastic sleeve tube 520 to enable the elastic sleeve tube 520 to expand in a radial direction of the through hole 212 to press the sealing sleeve 510 and form, on an outer wall of the elastic sleeve tube 520, a raised portion 525 that rivets the sealing sleeve 510 to the through hole 212.

As shown in FIG. 6, when the central rod 530 is mounted in the first mounting hole 521, the elastic sleeve tube 520 will expand in the radial direction of the through hole 212 and also press the sealing sleeve 510 outside in the radial direction, so that the sealing assembly 215 can be in an interference-fit with the through hole 212 so as to achieve sealing of the through hole 212. In addition, the height of the sealing assembly 215 is set to be greater than the depth of the through hole 212. In this way, when the central rod 530 is provided in the first mounting hole 521, for the portion of the lower end of the elastic sleeve tube 520 that extends beyond the through hole 212 and into the battery cell 20 in FIG. 6, the outer wall of the elastic sleeve tube 520 forms a raised portion 525 protruding relative to the through hole 212 under the action of the central rod 530. This raised portion 525 allows the lower end portion of the sealing sleeve 510 to also form a protruding portion 515, and this raised portion 525 and the protruding portion 515 allow the sealing sleeve 510 to be riveted to the through hole 212, thereby achieving fixing and sealing of the sealing assembly 215 in the axial direction of the through hole 212 to prevent the disengagement of the sealing assembly 215 in the axial direction of the through hole 212.

Therefore, in the sealing assembly 215 for sealing the through hole 212 according to the embodiment of the present application, when the central rod 530 is provided in the first mounting hole 521 of the elastic sleeve tube 520, the elastic sleeve tube 520 can expand in the radial direction of the through hole 212 and then press the sealing sleeve 510, so that the sealing sleeve 510 is in an interference-fit with the through hole 212 to achieve the purpose of sealing the through hole 212. Moreover, by means of such radial pressing, the portion of the sealing sleeve 510 located inside the battery cell 20 is turned outward relative to the through hole 212 after pressing, and the elastic sleeve tube 520 turned outward forms the raised portion 525. In addition, the sealing sleeve 510 correspondingly forms a protruding portion 515, so that the sealing assembly 215 corresponding to the protruding portion 515 has a greater diameter than the through hole 212 and is then fastened and fixed to the through hole 212 to ensure the stable fixing of the sealing assembly 215 in the axial direction of the through hole 212. Also, since threaded connection is used between the central rod 530 and the elastic sleeve tube 520, the sealing assembly 215 can be quickly disassembled without destroying components. In this way, taking an example of using the sealing assembly 215 to seal a liquid injection hole in the battery cell 20, it is possible to maintain a constant appearance of the battery cell 20 before and after liquid injection or replenishment, and maintain the sealing performance of the battery cell 20.

The components of the sealing assembly 215 will be described in detail below in conjunction with the accompanying drawings.

Figure 9:
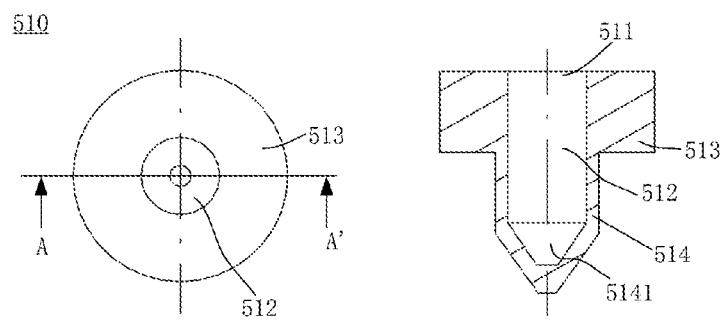
FIG. 9 is a schematic diagram of a sealing sleeve according to an embodiment of the present application.

FIG. 9 shows a schematic diagram of the sealing sleeve 510 according to an embodiment of the present application. In FIG. 9, a top view of the sealing sleeve 510 is shown on the left, and a cross-sectional view of the sealing sleeve 510 along line A-A' shown in the left view is shown on the right. As shown in FIG. 9, the sealing sleeve 510 is of a hollow structure provided with an opening 511 at one end, and a cavity 512 of the sealing sleeve 510 is in communication with the opening 511. Also, when the sealing sleeve 510 is mounted in the through hole 212, the opening 511 faces the exterior of the battery cell 20, which facilitates further mounting the elastic sleeve tube 520 in the cavity 512 through the opening 511.

Specifically, as shown in FIG. 9, the sealing sleeve 510 may comprise a first head portion 513 and a first main body portion 514. The first head portion 513 and the first main body portion 514 may be of an integral structure. The first main body portion 514 has the opening 511 and the cavity 512, the first head portion 513 being provided around an outer edge of the opening 511, the first main body portion 514 being provided in the through hole 212, and the first head portion 513 being fixed outside the through hole 212.

It should be understood that the first main body portion 514 according to the embodiment of the present application is provided in the through hole 212, so that the external shape of the first main body portion 514 is consistent with that of the through hole 212. For example, considering that the through hole 212 of the battery cell 20 is generally provided in a circular shape, the external shape of the first main body portion 514 may be correspondingly provided in a cylindrical shape to adapt to the through hole 212. Also, the cavity 512 inside the first main body portion 514 and the first head portion 513 may be shaped according to practical applications, for example, may be provided in a circular shape, which is not limited in the embodiment of the present application.

As shown in conjunction with FIGS. 8 and 9, the first head portion 513 of the sealing sleeve 510 may be provided outside the through hole 212, that is, may be provided on an upper surface of the end cap 211 facing the exterior of the battery cell 20. Optionally, a surface of the end cap 211 may have a recess 2111, with an opening of the recess 2111 facing the exterior of the battery cell 20, the through hole 212 may be provided on a bottom wall of the recess 2111, and the first head portion 513 may be provided in the recess 2111. The depth of the recess 2111 may be less than, equal to, or greater than the thickness of the first head portion 513. In addition, the lower surface of the bottom wall of the recess 2111 facing the interior of the battery cell 20 may be flush with an inner surface of the end cap 211 facing the interior of the battery cell 20. Alternatively, as shown in FIG. 8, the lower surface of the bottom wall of the recess 2111 may also be recessed toward the interior of the battery cell 20 relative to the inner surface of the end cap 211, which can increase the thickness of the bottom wall of the recess 2111 to improve the strength of the recess 2111.

As shown in FIG. 9, the other end of the sealing sleeve 510 opposite the opening 511 according to the embodiment of the present application may be provided to be sealed. Alternatively, different from FIG. 9, the other end may be designed as an opening. Since the other end of the sealing sleeve 510 opposite the opening 511 is provided inside the battery cell 20, the other end provided to be sealed can improve the sealing performance of the sealing assembly 215.

In addition, if the other end of the sealing sleeve 510 opposite the opening 511 is provided to be sealed, as shown in FIG. 9, a lower portion of the first main body portion 514 may also be provided as a hollow region 5141, for example, the hollow region 5141 may be provided in a triangular shape as shown in FIG. 9 or may be provided in other shapes. Specifically, considering that the central rod 530 and the elastic sleeve tube 520, when provided in the cavity 512 of the sealing sleeve 510, will press the first main body portion 514 of the sealing sleeve 510 so as to form compression sealing between the first main body portion 514 of the sealing sleeve 510 and the inner wall of the through hole 212, if the other end of the sealing sleeve 510 opposite the opening 511 is provided to be sealed, the lower portion of the first main body portion 514 may be provided with a hollow region 5141 in order to prevent the structural tear of the first main body portion 514 due to the excessive local deformation. As shown in conjunction with FIGS. 6 and 9, the elastic sleeve tube 520, when being mounted in the cavity 512, will not reach the hollow region 5141, so that the hollow region 5141 can deform as the elastic sleeve tube 520 expands in the radial direction, and form the protruding portion 515 of the sealing sleeve 510, and the hollow region 5141 can prevent the tear of the first main body portion 514 due to excessive local deformation.

It should be understood that, as shown in FIG. 9, the first main body portion 514 may be of a structure having equal wall thickness, that is, the portion of the first main body portion 514 in contact with the inner wall of the through hole 212 may have a wall thickness equal to that of the hollow region 5141 of the lower portion. Alternatively, the first main body portion 514 may also be provided to have a non-uniform wall thickness, for example, the local wall thickness of the first main body portion 514 may be increased according to practical applications, which is not limited in the embodiment of the present application.

Considering that a part of the sealing sleeve 510 is provided inside the battery cell 20 and will come into contact with the electrolytic solution, the sealing sleeve 510 may be made of an insulating polymeric material resistant to the electrolytic solution, for example, fluororubber or an ethylene propylene rubber, which is not limited in the embodiment of the present application.

Figure 10:
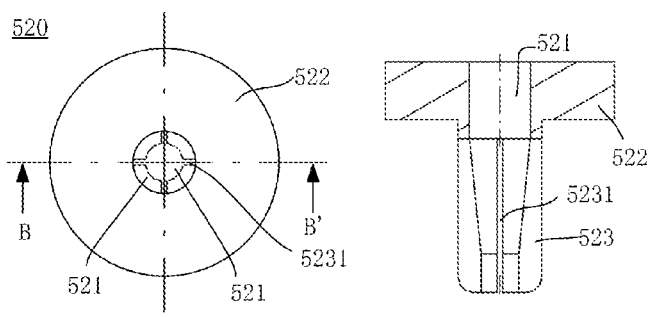
FIG. 10 is a schematic diagram of an elastic sleeve tube according to an embodiment of the present application.
Figure 11:
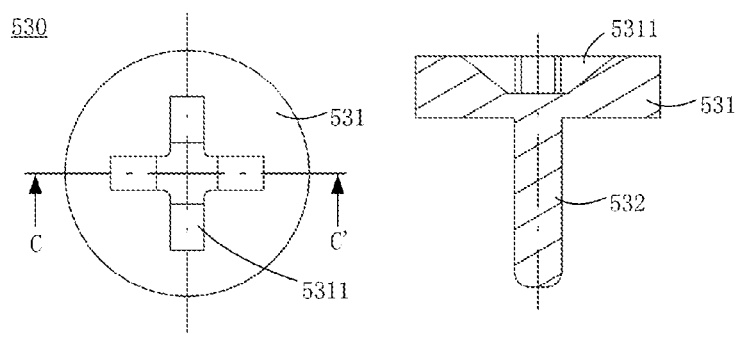
FIG. 11 is a schematic diagram of a central rod according to an embodiment of the present application.

FIG. 10 shows a schematic diagram of the elastic sleeve tube 520 according to an embodiment of the present application. In FIG. 10, a top view of the elastic sleeve tube 520 is shown on the left, and a cross-sectional view of the elastic sleeve tube 520 along line B-B' shown in the left view is shown on the right. FIG. 11 shows a schematic diagram of the central rod 530 according to an embodiment of the present application. In FIG. 11, a top view of the central rod 530 is shown on the left, and a cross-sectional view of the central rod 530 along line C-C' shown in the left view is shown on the right. As shown in FIGS. 10 and 11, the elastic sleeve tube 520 according to the embodiment of the present application is provided in the cavity 512 of the sealing sleeve 510, the elastic sleeve tube 520 has the first mounting hole 521 that extends in the axial direction of the through hole 212, and the first mounting hole 521 can be used for mounting the central rod 530. The central rod 530 is in threaded connection with the elastic sleeve tube 520, and when the central rod 530 is provided in the first mounting hole 521, the elastic sleeve tube 520 can expand in the radial direction of the through hole 212 so as to press the sealing sleeve 510 on the outer side, the sealing sleeve 510 is pressed to deform, and the sealing sleeve 510 is in an interference-fit with the through hole 212 so as to seal the through hole 212.

Optionally, the central rod 530 according to the embodiment of the present application may be made of a high-strength metal that is not easily deformed, and the elastic sleeve tube 520 will radially expand under the action of the central rod 530, and thus the elastic sleeve tube 520 may be made of a material with elasticity, for example, may also be made of a metal material with high strength and good elasticity, such as spring steel and beryllium bronze. For another example, a high polymer material with equivalent mechanical properties may also be selected, which is not limited in the embodiment of the present application.

In addition, considering that if the central rod 530 and the elastic sleeve tube 520 are both made of a metal material, metal filings may be generated due to friction between the central rod and the elastic sleeve tube during the relative movement of the central rod 530 relative to the elastic sleeve tube 520, the end of the sealing sleeve 510 close to the interior of the battery cell 20 may be provided to be sealed, so as to prevent the generated metal filings from falling into the interior of the battery cell 20 and thus prevent short-circuit runaway of the battery cell 20 caused by the metal filings.

Specifically, as shown in FIGS. 6, 10 and 11, the elastic sleeve tube 520 according to the embodiment of the present application may comprise a second head portion 522 and a second main body portion 523. The central rod 530 may comprise a third head portion 531 and a third main body portion 532. The second head portion 522 and the second main body portion 523 may be of an integral structure, and the third head portion 531 and the third main body portion 532 may be of an integral structure. The second main body portion 523 is provided with a first mounting hole 521, and the second head portion 522 is provided around an outer edge of the first mounting hole 521. The third head portion 531 is provided on one side of the third main body portion 532. When being mounted, the second main body portion 523 is provided in the cavity 512 while the second head portion 522 at least partially covers the first head portion 513, and the third main body portion 532 is provided in the first mounting hole 521 while the third head portion 531 at least partially covers the second head portion 522.

It should be understood that the second main body portion 523 according to the embodiment of the present application is provided in the cavity 512, so that the external shape of the second main body portion 523 is consistent with the shape of the cavity 512. For example, the cavity 512 may be in a cylindrical shape, and correspondingly, the external shape of the second main body portion 523 may also be provided in a cylindrical shape. Similarly, the third main body portion 532 according to the embodiment of the present application is provided in the first mounting hole 521, so that the shape of the third main body portion 532 is consistent with that of the first mounting hole 521. For example, the first mounting hole 521 may be in a cylindrical shape, and correspondingly, the outer shape of the third main body portion 532 may also be a cylindrical shape. In addition, the second head portion 522 and the third head portion 531 may be shaped according to practical applications, for example, as shown in FIGS. 10 and 11, the second head portion 522 and the third head portion 531 may be both provided in a cylindrical shape, which is not limited in the embodiment of the present application.

In the embodiment of the present application, the elastic sleeve tube 520 may be in threaded connection with the central rod 530, that is, an outer wall of the third main body portion 532 is in threaded connection with an inner wall of the second main body portion 523. Since the threaded connection is easy to disassemble, quick assembly and disassembly between the sealing assembly 215 and the end cap 211 can be achieved. Optionally, the thread between the elastic sleeve tube 520 and the central rod 530 may be a thread having a self-locking effect, so as to ensure that the central rod 530 is not easy to disengage from the elastic sleeve tube 520 during the vibration of the sealing assembly 215 used in the battery cell 20, so that the raised portion of the end of the sealing assembly 215 located inside the battery cell 20 will not disappear, so that the sealing assembly 215 can be well fixedly sealed in the through hole 212, improving the sealing performance and stability of the sealing assembly 215.

Optionally, as shown in FIGS. 10 and 11, an outer surface of the third head portion 531 of the central rod 530 may be provided with an interface 5311, and the interface 5311 is a universal tool interface for insertion of an external tool. In this way, rotation of the central rod 530 in the first mounting hole 521 around the axis of the first mounting hole 521 can be achieved by means of this tool. Since the outer wall of the third main body portion 532 is in threaded connection with the inner wall of the second main body portion 523, the rotation of the central rod 530 around the axis under the action of the external tool can be converted into moving up and down in the axial direction, and then the assembly and disassembly of the sealing assembly 215 are achieved. Optionally, this interface 5311 may be provided in any shape according to the practical applications. For example, according to a tool for use in mounting, this interface 5311 may be provided in a cross-shape as shown in FIG. 10, or may also be provided in a slotted shape or other general structural shapes, which is not limited in the embodiment of the present application.

Figure 12:
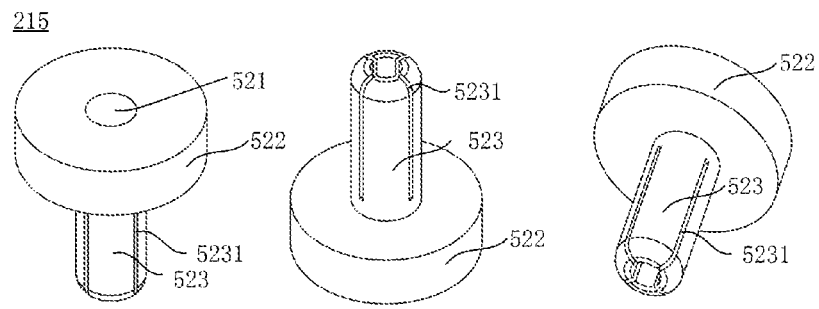
FIG. 12 is a schematic diagram of an elastic sleeve tube according to an embodiment of the present application from different perspectives.

It should be understood that, as shown in FIGS. 10 and 11, during mounting, the elastic sleeve tube 520 expands in the radial direction of the first mounting hole 521 as the central rod 530 moves downward in the first mounting hole 521. The radial expansion of the elastic sleeve tube 520 may be achieved by means of a slit formed in the second main body portion 523. Specifically, FIG. 12 shows a schematic diagram of the elastic sleeve tube 520 in an embodiment of the present application from different perspectives. As shown in FIGS. 10 and 12, the second main body portion 523 may comprise at least one slit 5231, and any of the slits 5231 extends, from the end of the second main body portion 523 away from the second head portion 522, to the other end in the axial direction of the first mounting hole 521, with the extension distance being set according to practical applications. In addition, in the radial direction of the through hole 212, the slit 5231 penetrates through the second main body portion 523, and the slit 5231 can allow the second main body portion 523 to expand in the radial direction of the through hole 212.

Optionally, each elastic sleeve tube 520 may be provided with one or more slits 5231, for example, four slits 5231 are taken as an example in the figure. In the case where the elastic sleeve tube 520 is provided with a plurality of slits 5231, the second main body portion 523 of the elastic sleeve tube 520 may be divided into a plurality of portions, so as to allow the lower portion of the elastic sleeve tube 520 to be turned outward at a large angle. The plurality of slits 5231 may be uniformly distributed on the second main body portion 523, that is, the plurality of slits 5231 have equal spacing therebetween. Further, the plurality of slits 5231 may also be symmetrically distributed, for example, as shown in FIG. 12, the second main body portion 523 of the elastic sleeve tube 520 are thus divided into a plurality of symmetrical components.

In the embodiment of the present application, the radial expansion of the elastic sleeve tube 520 can be adjusted by means of setting the diameter of the third main body portion 532 of the central rod 530 and the inner diameter of the first mounting hole 521 of the elastic sleeve tube 520, so as to press the sealing sleeve 510 to achieve sealing. For example, in order to achieve the radial expansion of the elastic sleeve tube 520 when the central rod 530 is mounted in the elastic sleeve tube 520, when the central rod 530 is not mounted in the first mounting hole 521, it may be provided that the third main body portion 532 has the same diameter at different positions, and at least part of region of the first mounting hole 521 of the elastic sleeve tube 520 has different inner diameters at different positions; or it may also be provided that at least part of region of the third main body portion 532 has different diameters at different positions, and the first mounting hole 521 of the elastic sleeve tube 520 has the same inner diameter at different positions; or it may also be provided that at least part of region of the third main body portion 532 has different diameters at different positions, and at least part of region of the first mounting hole 521 of the elastic sleeve tube 520 also has different inner diameters at different positions, which is not limited in the embodiment of the present application. For ease of description, the case where the third main body portion 532 has the same diameter at different positions, and at least part of region of the first mounting hole 521 of the elastic sleeve tube 520 has different inner diameters at different positions is taken as an example herein.

Optionally, as shown in FIGS. 10 and 11, when the central rod 530 is not mounted in the first mounting hole 521, it may also be provided that at least part of the first mounting hole 521 has an inner diameter gradually decreasing in a first direction that is directed from the end of the sealing sleeve 510 having the opening 511 to the other end opposite the opening 511, that is, the inner diameter of at least part of the first mounting hole 521 gradually decreases from the exterior of the battery cell 20 to the interior of the battery cell 20. In this way, during the central rod 530 moving downward in the first mounting hole 521, since the lower portion of the elastic sleeve tube 520 has a smaller inner diameter, the elastic sleeve tube will be pressed by the central rod 530 and turned outward, that is, the elastic sleeve tube 520 is caused to expand in the radial direction and then press the sealing sleeve 510 so as to form the sealing between the sealing sleeve and the through hole 212. Also, the radial expansion of the elastic sleeve tube 520 allows the portion of the lower end thereof beyond the through hole 212 to form the raised portion 525. This raised portion 525 makes the sealing sleeve 510 riveted to the through hole 212.

Specifically, as shown in FIG. 10, the first mounting hole 521 may be divided, according to different inner diameters, into three segments in a height direction: a first segment close to the exterior of the battery cell 20, a third segment close to the interior of the battery cell 20, and a second segment located between the first segment and the third segment. In the first segment, the first mounting hole 521 has equal inner diameter at different positions. In the third segment, the first mounting hole 521 also has equal inner diameter at different positions. However, in the second segment, the inner diameter of the first mounting hole 521 linearly decreases from the side close to the first segment to the side close to the third segment, the inner diameter of the first mounting hole 521 in the first segment is equal to the maximum value of the inner diameter of the first mounting hole 521 in the second segment, and the inner diameter of the first mounting hole 521 in the third segment is equal to the minimum value of the inner diameter of the first mounting hole 521 in the second segment. Optionally, in the embodiment of the present application, the inner diameter of at least part of the first mounting hole 521 gradually decreases from the end facing the first head portion 513 to the end away from the opening 511, which may refer to the case as shown in FIG. 10, that is, the first mounting hole 521 comprises the first segment to the third segment described above, or may be different from the case as shown in FIG. 10, may also refer to the case where the first mounting hole 521 comprises the second segment but does not comprise the first segment, does not comprise the third segment, or does not comprise both the first segment and the third segment.

Figure 13:
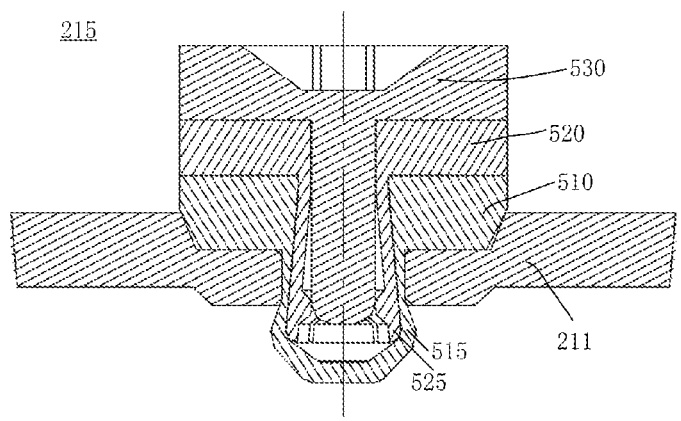
FIG. 13 is a cross-sectional view of a partial region of an end cap provided with a sealing assembly according to another embodiment of the present application.
Figure 14:
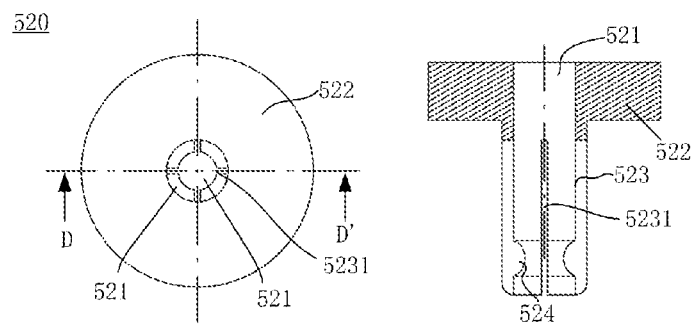
FIG. 14 is a schematic diagram of an elastic sleeve tube according to another embodiment of the present application.

Optionally, the first mounting hole 521 may also have different inner diameters at different positions by means of providing a protruding structure on the inner wall of the first mounting hole 521. Specifically, FIG. 13 shows a cross-sectional view of a partial region of an end cap 211 provided with the sealing assembly 215 in another embodiment of the present application. FIG. 14 shows a possible schematic diagram of the elastic sleeve tube 520 in FIG. 13. In FIG. 14, a top view of the elastic sleeve tube 520 is shown on the left, and a cross-sectional view of the elastic sleeve tube 520 along line D-D' shown in the left view is shown on the right. It should be understood that FIG. 13 is different from FIG. 6 in that as shown in FIGS. 13 and 14, the elastic sleeve tube 520 is provided with a protruding structure 524 on the inner wall of the first mounting hole 521 of the elastic sleeve tube 520 at the end close to the battery cell 20. In this way, the protruding structure 524 can be pressed by the central rod 530 during the central rod 530 moving downward in the first mounting hole 521, so that the elastic sleeve tube 520 expands in the radial direction of the through hole 212 and then press the sealing sleeve 510 so as to form a seal between the sealing sleeve 510 and the through hole 212. Moreover, by means of such radial expansion, the elastic sleeve tube 520 is turned outward to form the raised portion 525, and the sealing sleeve 510 correspondingly forms the protruding portion 515, so that the portion of the sealing assembly 215 corresponding to the protruding portion 515 has a greater diameter than the through hole 212 and is then fastened and fixed to the through hole 212 to ensure the stable fixing of the sealing assembly structure 215 in the axial direction of the through hole 212.

Optionally, this protruding structure 524 may also be provided only on the portion of the elastic sleeve tube 520 beyond the end cap 211, so that the protruding structure 524 is only used to achieve the riveting of the sealing sleeve 510 to the end cap 211.

Optionally, this protruding structure 524 may be shaped and sized according to practical applications, and for example, as shown in FIGS. 13 and 14, the cross section of the protruding structure 524 may be provided in the shape of a circular arc. In addition, considering that the lower half portion of the second main body portion 523 is divided into a plurality of portions by means of the plurality of slits 5231, the protruding structure 524 may be correspondingly provided in one or more of the plurality of portions. For example, in the figure, taking the second main body portion 523 being divided into four portions as an example, each of the four portions may be provided with a protruding structure 524, with a total of four protruding structures 524 being provided. The four protruding structures 524 may be the same or different in terms of shape, configuration position in a height direction, and size, which is not limited in the embodiment of the present application. For example, FIG. 14 shows an example of the four protruding structures 524 being the same in terms of shape, configuration position in the height direction, and size, so that the portions of the elastic sleeve tube 520 expanding in the axial direction also have the same size.

It should be understood that the components in FIG. 13 are consistent with those in FIG. 6, except for the protruding structure 524 provided on the inner wall of the elastic sleeve tube 520 being configured in a different manner from the elastic sleeve tube 520 in FIG. 6, and are applicable to relevant description and will not be repeated herein for the sake of brevity.

Optionally, apart from two manners of setting the inner diameter of the first mounting hole 521 shown in FIGS. 10 and 14, the inner diameter of the first mounting hole 521 may also be set in other manners, and the different manners may be used independently or in combination. For example, the two manners of setting the inner diameter of the first mounting hole 521 shown in FIGS. 10 and 14 may be used independently or may be combined, that is, the inner diameter of the first mounting hole 521 gradually decreases from the exterior of the battery to the interior of the battery. Also, the protruding structure 524 may also be provided in the first mounting hole 521, which is not limited in the embodiment of the present application.

It should be understood that the central rod 530 is provided in and is in threaded connection with the first mounting holes 521 to enable the elastic sleeve tube 520 to expand in the radial direction of the through hole 212 and press the sealing sleeve 510, so that the sealing sleeve 510 is in an interference-fit with the through hole 212 so as to achieve the radial sealing of the through hole 212. Thus, in the axial direction of the through hole 212, the sealing assembly 215 may further comprise an outer sleeve member in order to further improve the axial stability of the sealing assembly 215.

Figure 15:
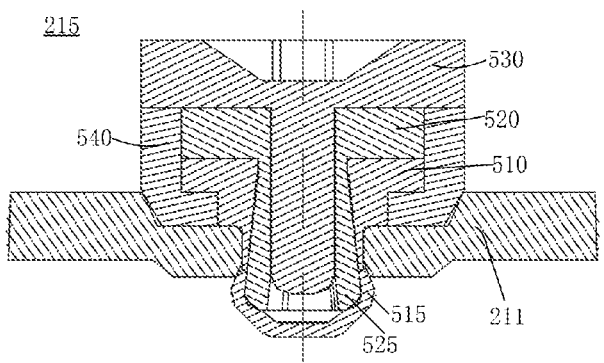
FIG. 15 is a cross-sectional view of a partial region of an end cap provided with a sealing assembly according to a further embodiment of the present application.
Figure 16:
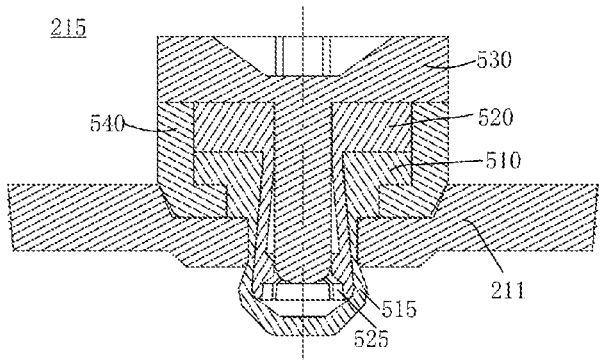
FIG. 16 is a cross-sectional view of a partial region of an end cap provided with a sealing assembly according to a further embodiment of the present application.
Figure 17:
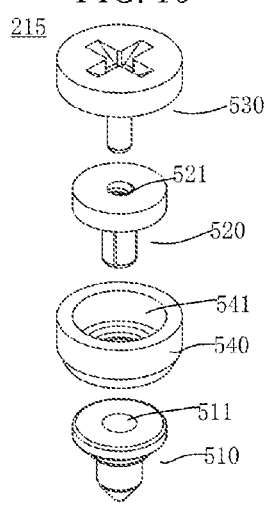
FIG. 17 is an exploded view of the sealing assembly shown in FIG. 15 or 16.

FIG. 15 shows a cross-sectional view of a partial region of the end cap 211 provided with the sealing assembly 215 according to another embodiment of the present application; FIG. 16 shows a cross-sectional view of a partial region of the end cap 211 provided with the sealing assembly 215 according to a further embodiment of the present application; and FIG. 17 shows an exploded view of the sealing assembly 215 in FIG. 15 or 16. As shown in FIGS. 15 to 17, the sealing assembly 215 may further comprise the outer sleeve member 540 provided outside the through hole 212, the outer sleeve member 540 being fixedly connected to the elastic sleeve tube 520 and the sealing sleeve 510. The outer sleeve member 540 according to the embodiment of the present application may be made of metal or hard plastic that is not easily deformed, which is not limited in the embodiment of the present application.

It should be understood that FIG. 15 corresponds to FIG. 6, and FIG. 15 is different from FIG. 6 in that the outer sleeve member 540 is provided in FIG. 15, and the description of the other components in FIG. 15 is applicable to the relevant description in FIG. 6 and will not be repeated herein for the sake of brevity. Similarly, FIG. 16 corresponds to FIG. 13, and FIG. 16 is different from FIG. 13 in that the outer sleeve member 540 is provided in FIG. 16, and the description of the other components in FIG. 16 is applicable to the relevant description in FIG. 13 and will not be repeated herein for the sake of brevity.

Figure 18:
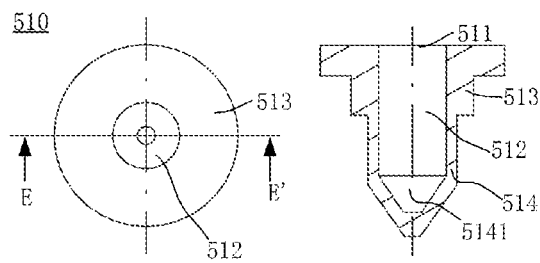
FIG. 18 is a schematic diagram of a sealing sleeve according to another embodiment of the present application.
Figure 19:
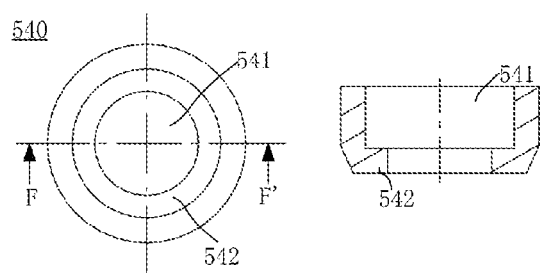
FIG. 19 is a schematic diagram of an outer sleeve member according to an embodiment of the present application.

Specifically, FIG. 18 shows a schematic diagram of the sealing sleeve 510 of the sealing assembly 215 shown in FIG. 15 or 16. In FIG. 18, a top view of the sealing sleeve 510 is shown on the left, and a cross-sectional view of the sealing sleeve 510 along line E-E' shown in the left view is shown on the right. FIG. 19 shows a schematic diagram of the outer sleeve member 540 of the sealing assembly 215 shown in FIG. 15 or 16. In FIG. 19, a top view of the outer sleeve member 540 is shown on the left, and a cross-sectional view of the outer sleeve member 540 along line F-F' shown in the left view is shown on the right. As shown in FIGS. 15 to 19, the outer sleeve member 540 has a second mounting hole 541, and the first head portion 513 and the second head portion 522 are both fixed in the second mounting hole 541 so as to achieve the fixing of the outer sleeve member 540 to the sealing sleeve 510 and the elastic sleeve tube 520.

Optionally, an inner wall of the outer sleeve member 540 may be in a threaded connection with the first head portion 513; and/or the inner wall of the outer sleeve member 540 may be in a threaded connection with the second head portion 522. The inner wall of the outer sleeve member 540 is provided with a thread such that the outer sleeve member 540, the sealing sleeve 510 and the elastic sleeve tube 520 can be disassembled. Also, the second mounting hole 541 of the outer sleeve member 540 may be shaped according to the shapes of the first head portion 513 and the second head portion 522. For example, in the figures, the first head portion 513 and the second head portion 522 are in a cylindrical shape, so the second mounting hole 541 is also provided in a cylindrical shape, which is not limited in the embodiment of the present application.

Optionally, for ease of installation, with regard to the sealing assembly 215 after being mounted, the surface of the end of the outer sleeve member 540 close to the third head portion 531 may be provided to be flush with the surface of the end of the second head portion 522 close to the third head portion 531, which will not affect the mounting of the third head portion 531 at the upper portion. In addition, the third head portion 531 may at least partially cover the end of the outer sleeve member 540 close to the third head portion 531. For example, as shown in FIGS. 15 and 16, the third head portion 531 may completely cover the end of the outer sleeve member 540 close to the third head portion 531 such that the outer sleeve member 540 can be fixed by means of the third head portion 531 of the central rod 530, and then the outer sleeve member 540 will not be disengaged in the axial direction of the through hole 212 during the use of the battery cell 20.

It should be understood that the external shape of the outer sleeve member 540 may be set according to the practical applications, for example, the external shape of the outer sleeve member 540 may be consistent with the shape of the third head portion 531 such that the third head portion 531 can completely cover the end of the outer sleeve member 540 close to the third head portion 531, which is not limited in the embodiment of the present application.

As shown in FIGS. 15 to 19, an inner wall of the second mounting hole 541 of the outer sleeve member 540 according to the embodiment of the present application may further have, at the end close to the through hole 212, a limiting portion 542 that extends in the axial direction of the through hole 212, and the limiting portion 542 may be used for fixing the sealing sleeve 510 and the elastic sleeve tube 520, for example, the first head portion 513 and the second head portion 522 may be fixed between the limiting portion 542 and the third head portion 531. The inner diameter of the limiting portion 542 is greater than that of the through hole 212 but is less than that of the end of the second mounting hole 541 away from the through hole 212.

Optionally, the limiting portion 542 provided on the inner wall of the second mounting hole 541 according to the embodiment of the present application may be in an annular shape, that is, an annular limiting portion 542 is provided around the first mounting hole 521, or a plurality of separate limiting portions 542 may also be provided on the inner wall of the second mounting hole 541, and for example, a plurality of limiting portions evenly distributed may be provided, which is not limited in the embodiment of the present application. For ease of description, the annular limiting portion 542 is taken as an example below.

In the embodiment of the present application, since the outer sleeve member 540 is provided with the limiting portion 542, the first head portion 513 may further be provided with a stepped structure. Specifically, as shown in FIGS. 15 to 19, the first head portion 513 is of a stepped structure such that the portion of the first head portion 513 close to the through hole 212 is provided between inner walls of the annular limiting portion 542, while the other portion of the first head portion 513 away from the through hole 212 is provided above the limiting portion 542 to cover the limiting portion 542. In this way, the outer sleeve member 540, the elastic sleeve tube 520, and the sealing sleeve 510 after being mounted are more stable, and the elastic sleeve tube 520 and the sealing sleeve 510 are not easily disengaged.

Figure 20:
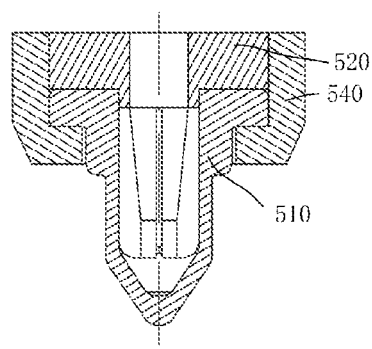
FIG. 20 is a schematic diagram of an outer sleeve member, an elastic sleeve tube and a sealing sleeve after being mounted according to an embodiment of the present application.
Figure 21:
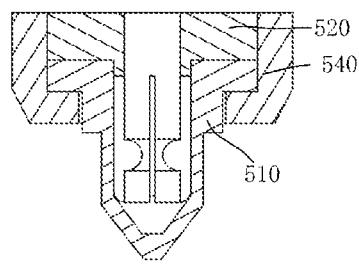
FIG. 21 is a schematic diagram of an outer sleeve member, an elastic sleeve tube and a sealing sleeve after being mounted according to an embodiment of the present application.

It should be understood that the outer sleeve member 540, the elastic sleeve tube 520, and the sealing sleeve 510 according to the embodiment of the present application may be mounted to form an integrated assembly to facilitate installation and disassembly of the sealing assembly 215. FIGS. 20 and 21 respectively show a schematic diagram of the outer sleeve member 540, the elastic sleeve tube 520 and the sealing sleeve 510 after being mounted in two embodiments of the present application, FIG. 20 corresponding to FIG. 15, and FIG. 21 corresponding to FIG. 16. As shown in FIGS. 15 to 16 and FIGS. 20 to 21, during the process of mounting the sealing assembly 215, the elastic sleeve tube 520 and the sealing sleeve 510 may be fixed in the second mounting hole 541 of the outer sleeve member 540 so that the three components can form the integrated assembly as shown in FIG. 20 or 21, then the integrated assembly is mounted in the through hole 212, the central rod 530 is rotated by means of a tool such that the central rod 530 is lowered in the first mounting hole 521, and the elastic sleeve tube 520 is spread and then presses the sealing sleeve 510, so that the sealing sleeve 510 is in an interference-fit with the through hole 212 so as to achieve the sealing of this through hole 212. During the process of lowering the central rod 530, the central rod 530 also applies axial pressure to the outer sleeve member 540, the elastic sleeve tube 520 and the sealing sleeve 510, which ensures that the components of the sealing assembly 215 will not move or disengage in the axial direction, so as to form a stable seal in the axial direction. On the contrary, when the sealing assembly 215 is disassembled, the central rod 530 is rotated and removed by means of the tool, and then the integrated assembly as shown in FIG. 20 or 21 is directly grasped by means of the tool, so that the outer sleeve member 540, the elastic sleeve tube 520 and the sealing sleeve 510 can be removed simultaneously, simplifying disassembly steps.

Therefore, in the sealing assembly 215 for sealing the through hole 212 according to the embodiment of the present application, when the central rod 530 is provided in the first mounting hole 521 of the elastic sleeve tube 520, the elastic sleeve tube 520 can expand in the radial direction of the through hole 212 and then press the sealing sleeve 510, so that the sealing sleeve 510 is in an interference-fit with the through hole 212 to achieve the purpose of sealing the through hole 212. Also, by means of such radial pressing, the portion of the sealing sleeve 510 located inside the battery cell 20 can also be turned outward relative to the through hole 212 after being pressed, and the sealing assembly 215 turned outward has a diameter greater than that of the through hole 212 and is then fastened and fixed to the through hole 212 to ensure the stable fixing of the sealing assembly 215 in the axial direction of the through hole 212. In addition, this sealing assembly 215 may further comprise an outer sleeve member 540, and the sealing sleeve 510 and the elastic sleeve tube 520 are fixed by means of the outer sleeve member 540, so that the sealing sleeve 510 and the elastic sleeve tube 520 are not easily disengaged in the axial direction of the through hole 212. Also, since the central rod 530 is in threaded connection with the elastic sleeve tube 520, the outer sleeve member 540 is also fixed to the sealing sleeve 510 and the elastic sleeve tube 520 by means of threaded connection, so the sealing assembly 215 can be quickly disassembled without destroying the components. In this way, taking an example of using the sealing assembly 215 to seal a liquid injection hole in the battery cell 20, it is possible to maintain the appearance of the battery cell 20 to be consistent before and after liquid injection or replenishment and maintain the sealing performance of the battery cell 20.

The battery and the power consuming apparatus according to the embodiments of the present application are described above, and a method and device for preparing a battery according to the embodiments of the present application will be described below. For the parts not described in detail, reference can be made to the foregoing embodiments.

Figure 22:
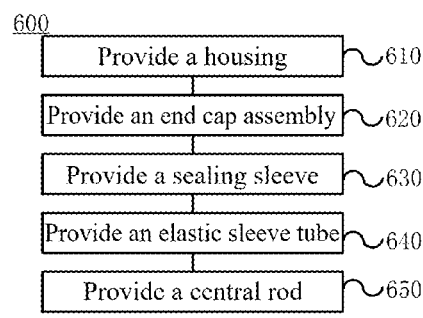
FIG. 22 is a schematic flowchart of a method for preparing a battery cell according to an embodiment of the present application.

FIG. 22 shows a schematic flowchart of a method 600 for preparing a sealing assembly according to an embodiment of the present application. As shown in FIG. 22, the method 600 may comprise: 610, providing a housing, with one end of the housing being provided with an opening; 620, providing an end cap assembly, which is used to close the opening of the housing and comprises an end cap and a sealing assembly, the end cap having a through hole for liquid injection; 630, providing a sealing sleeve provided in the through hole and having a cavity and an opening that is in communication with the cavity; 640, providing an elastic sleeve tube, which is provided in the cavity and has a first mounting hole that extends in an axial direction of the through hole; and 640, providing a central rod, which is provided in the first mounting hole and is in threaded connection with the elastic sleeve tube to enable the elastic sleeve tube to expand in a radial direction of the through hole to press the sealing sleeve and form, on an outer wall of the elastic sleeve tube, a raised portion that rivets the sealing sleeve to the through hole.

Figure 23:
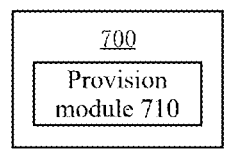
FIG. 23 is a schematic block diagram of a device for preparing a battery cell according to an embodiment of the present application.

FIG. 23 shows a schematic block diagram of a device 700 for preparing a sealing assembly according to an embodiment of the present application. As shown in FIG. 23, the device 700 may comprise a provision module 710. The provision module 710 is used for: providing a housing, with one end of the housing being provided with an opening; providing an end cap assembly, which is used to close the opening of the housing and comprises an end cap and a sealing assembly, the end cap having a through hole for liquid injection; providing a sealing sleeve, which is provided in the through hole and has a cavity and an opening that is in communication with the cavity; providing an elastic sleeve tube, which is provided in the cavity and has a first mounting hole that extends in an axial direction of the through hole; and providing a central rod, which is provided in the first mounting hole and is in threaded connection with the elastic sleeve tube to enable the elastic sleeve tube to expand in a radial direction of the through hole to press the sealing sleeve and form, on an outer wall of the elastic sleeve tube, a raised portion that rivets the sealing sleeve to the through hole.

Finally, it should be noted that the above embodiments are merely used for illustrating rather than limiting the technical solution of the present application. Although the present application is illustrated in detail with reference to the foregoing embodiments, those of ordinary skill in the art should understand that the technical solutions specified in the foregoing embodiments may still be modified, or some of the technical features therein may be equivalently replaced. However, these modifications or substitutions do not make the essence of the corresponding technical solutions depart from the spirit and scope of the technical solutions of the embodiments of the present application.

The invention claimed is:

1. A sealing assembly for sealing a through hole, comprising:
    a sealing sleeve provided in the through hole and having a cavity and an opening, the opening being in communication with the cavity;
    an elastic sleeve tube provided in the cavity, the elastic sleeve tube having a first mounting hole that extends in an axial direction of the through hole, an inner wall, and an outer wall; and
    a central rod provided in the first mounting hole and being in threaded connection with the elastic sleeve tube to enable the elastic sleeve tube to expand in a radial direction of the through hole to press the sealing sleeve and form, on the outer wall of the elastic sleeve tube, a raised portion that rivets the sealing sleeve to the through hole,
    wherein one end, away from the opening, of the inner wall of the elastic sleeve tube is provided with at least one protruding structure, the at least one protruding structure protrudes in the radial direction and is configured to be pressed by the central rod to enable the elastic sleeve tube to expand in the radial direction of the through hole.

2. The sealing assembly according to claim 1, wherein the sealing sleeve further has a sealing end provided opposite the opening.

3. The sealing assembly according to claim 1, wherein when the central rod is not provided in the elastic sleeve tube, the first mounting hole has different inner diameters at positions.

4. The sealing assembly according to claim 3, wherein when the central rod is not provided in the elastic sleeve tube, at least part of the first mounting hole has an inner diameter gradually decreasing in a first direction that is directed from the end at the opening of the sealing sleeve to the end opposite the opening.

5. The sealing assembly according to claim 1, wherein the sealing sleeve comprises a first head portion and a first main body portion, the first main body portion having the opening and the cavity, the first head portion being provided around an outer edge of the opening, the first main body portion being provided in the through hole, and the first head portion being fixed outside the through hole.

6. The sealing assembly according to claim 5, wherein the elastic sleeve tube comprises a second head portion and a second main body portion, the second main body portion being provided with the first mounting hole, the second head portion being provided around an outer edge of the first mounting hole, the second main body portion being provided in the cavity, and the second head portion at least partially covering the first head portion.

7. The sealing assembly according to claim 6, characterized in that the second main body portion comprises at least one slit, the slit extending, in the axial direction of the through hole, from an end of the second main body portion away from the opening to the other end and penetrating the second main body portion in the radial direction of the through hole, and the slit being provided to achieve the expansion of the second main body portion in the radial direction of the through hole.

8. The sealing assembly according to claim 6, wherein the central rod comprises a third head portion and a third main body portion, the third head portion being provided on one side of the third main body portion, the third main body portion being provided in the first mounting hole, and the third head portion at least partially covering the second head portion.

9. The sealing assembly according to claim 8, characterized in that an outer wall of the third main body portion is in threaded connection with an inner wall of the second main body portion.

10. The sealing assembly according to claim 8, wherein the sealing assembly further comprises:
an outer sleeve member provided outside the through hole, the outer sleeve member being fixedly connected to the elastic sleeve tube and the sealing sleeve.

11. The sealing assembly according to claim 10, wherein that the outer sleeve member has a second mounting hole, and the first head portion and the second head portion are both fixed in the second mounting hole.

12. The sealing assembly according to claim 10, wherein the inner wall of the outer sleeve member is in threaded connection with the first head portion; and/or
the inner wall of the outer sleeve member is in threaded connection with the second head portion.

13. The sealing assembly according to claim 10, wherein a surface of an end of the outer sleeve member close to the third head portion is flush with the surface of the end of the second head portion close to the third head portion.

14. The sealing assembly according to claim 10, wherein the third head portion at least partially covers the end of the outer sleeve member close to the third head portion.

15. The sealing assembly according to claim 10, wherein the end of the outer sleeve member close to the through hole has a limiting portion that extends in the axial direction of the through hole, and the first head portion and the second head portion are provided between the limiting portion and the third head portion.

16. An end cap assembly, wherein the end cap assembly is provided on a battery cell, and the end cap assembly comprises:
an end cap having a through hole for liquid injection; and
a sealing assembly according to claim 1 for sealing the through hole.

17. A battery, characterized by comprising:
a plurality of battery cells, including at least one battery cell characterized by comprising a housing, with one end of the housing being provided with an opening, and an end cap assembly according to claim 16 for closing the opening of the housing.

18. The sealing assembly according to claim 1, wherein:
the at least one protruding structure comprises a plurality of protruding structures circumferentially provided on the inner wall of the of the elastic sleeve tube.

19. The sealing assembly according to claim 7, wherein:
the at least one slit comprises a plurality of slits,
a lower half portion of the second main body portion is divided into a plurality of portions by the plurality of slits,
the at least one protruding structure comprises a plurality of protruding structures corresponding to the plurality of portions, the plurality of protruding structures are circumferential provided on the inner wall of the of the elastic sleeve tube, and
the plurality of protruding structures are the same with respect to shape, configuration position in a height direction, and size.

* * * * *